United States Patent
Salkintzis et al.

(10) Patent No.: US 9,749,932 B2
(45) Date of Patent: Aug. 29, 2017

(54) WIRELESS COMMUNICATION DEVICE, WIRELESS COMMUNICATION SYSTEM, AND RELATED METHODS

(75) Inventors: Apostolis K. Salkintzis, Athens (GR); Howard P. Benn, Swindon (GB)

(73) Assignee: Google Technology Holdings LLC, Mountain View, CA (US)

(*) Notice: Subject to any disclaimer, the term of this patent is extended or adjusted under 35 U.S.C. 154(b) by 87 days.

(21) Appl. No.: 13/178,432

(22) Filed: Jul. 7, 2011

(65) Prior Publication Data
US 2013/0012260 A1   Jan. 10, 2013

(51) Int. Cl.
H04Q 7/10 (2006.01)
H04W 48/08 (2009.01)
H04W 48/16 (2009.01)
H04W 48/18 (2009.01)

(52) U.S. Cl.
CPC ............ *H04W 48/08* (2013.01); *H04W 48/16* (2013.01); *H04W 48/18* (2013.01)

(58) Field of Classification Search
CPC . H04W 48/16; H04W 36/0005; H04W 36/12; H04W 84/12
USPC ........ 455/435.1, 435.2, 550.1; 370/230, 401, 370/328, 338
See application file for complete search history.

(56) References Cited

U.S. PATENT DOCUMENTS

| | | | |
|---|---|---|---|
| 2010/0039936 A1* | 2/2010 | Jin et al. | ........................ 370/230 |
| 2010/0208698 A1 | 8/2010 | Lu et al. | |
| 2010/0216462 A1 | 8/2010 | Aso et al. | |
| 2010/0267383 A1* | 10/2010 | Konstantinou et al. | ... 455/435.2 |
| 2011/0069638 A1 | 3/2011 | Ishizu et al. | |
| 2011/0072101 A1 | 3/2011 | Forssell et al. | |
| 2012/0076117 A1* | 3/2012 | Montemurro | ......... H04W 48/16 370/338 |

(Continued)

FOREIGN PATENT DOCUMENTS

| | | | | |
|---|---|---|---|---|
| FI | WO 2011/038771 | * | 10/2009 | ............ H04W 48/08 |
| WO | 2009103678 A1 | | 8/2009 | |
| WO | 2010037422 A1 | | 4/2010 | |

(Continued)

OTHER PUBLICATIONS

IEEE Standards in Communications and Networking, "Architecture and Enablers for Optimized Radio Resource Usage in Heterogeneous Wireless Access Networks: The IEEE 1900.4 Working Group" Buljore, et al., Jan. 2009, pp. 122-129.

(Continued)

*Primary Examiner* — Ajit Patel
*Assistant Examiner* — Julio Perez
(74) *Attorney, Agent, or Firm* — Lerner, David, Littenberg, Krumholz & Mentlik, LLP

(57) ABSTRACT

A wireless communication system 5 comprises a wireless communication device arranged to detect multiple wireless access networks available for connection to the wireless communication device for providing data services. The device is arranged to discover one or more access capabilities of at least one of the detected wireless access networks, and compares the discovered access capabilities with a mobility policy so as to select an available wireless access networks for connection. Access capabilities may include aspects such as IP protocols and ports allowed by an access network, and capacity constraints such as available uplink and downlink transmission rates.

11 Claims, 4 Drawing Sheets

(56) References Cited

U.S. PATENT DOCUMENTS

2012/0324100 A1* 12/2012 Tomici et al. ............... 709/224

FOREIGN PATENT DOCUMENTS

WO        2010080966 A1    7/2010
WO        2011038771 A1    4/2011

OTHER PUBLICATIONS

3GPP TS 23.402 v10.4.0 (Jun. 2011) 3rd Generation Partnership Project; Technical Specification Group Services and System Aspects; Architecture enhancements for non-3GPP accesses (Release 10), 231 pages.

3GPP TS 24.312 v10.3.0 (Jun. 2011) 3rd Generation Partnership Project; Technical Specification Group Core Network and Terminals; Access Network Discovery and Selection Function (ANDSF) Management Object (MO) (Release 10), 155 pages.

Patent Cooperation Treaty, "PCT Search Report and Written Opinion of the International Searching Authority" for International Application No. PCT/US2012/042859 dated Aug. 1, 2012, 16 pages.

3GPP TSG SA WB2 #84, TD S2-112-182 "Justification and Scenarios for the DIDA TR" Qualcomm Inc et al., Bratislava, Slovakia; Apr. 11-15, 2011, 2 pages.

"Network Optimization Focus Group (NetOp-FG) Assessment and Recommendations" ATIS, Sep. 2011, <http://www.atis.org/>, downloaded by EPO on Nov. 8, 2011, 61 pages.

* cited by examiner

WIRELESS COMMUNICATION DEVICE, WIRELESS COMMUNICATION SYSTEM, AND RELATED METHODS

FIELD OF THE DISCLOSURE

This disclosure relates to wireless communication devices, a wireless communication system comprising such devices, and a method in such a wireless communication system, in which the wireless communication devices are adapted to select an available wireless access network for connection and provision of data services.

BACKGROUND OF THE DISCLOSURE

The $3^{rd}$ Generation Partnership project 3GPP has specified methods that allow a wireless communication device to discover and preferentially select for connection from available non-3GPP wireless access networks such as Wi-Fi type networks. In particular, 3GPP technical specification 23.402 provides for an Access Network Discovery Selection Function (ANDSF), which is an optional policy-provisioning element in the 3GPP network architecture which contains data management and control functionality necessary to provide network discovery and selection assistance according to a network operator's policy. The ANDSF may respond to requests from a wireless communication device for access network discovery and selection information in a pull mode, and may be configured to initiate such data transfer to a wireless communication device in a push mode.

The ANDSF may provide to the wireless communication device one or more inter-system mobility policies for use if and when a device can route IP traffic over a single radio access interface at a given time, or one or more inter-system routing policies for use if and when a device can route IP traffic simultaneously over multiple radio interfaces. Such policies may define, for example, at what times and locations the wireless communication device may use or move between particular access networks or networks of particular technology types, and/or to select the most preferable access technology type in general or in particular circumstances. For example, an inter-system mobility policy may indicate a list of wireless access networks with priority order (as preferred by the mobile operator to be accessed) and with validity information (e.g. location or time of day) indicating when this policy is considered valid. A wireless communication device provisioned with such inter-system mobility policy should attempt to access the operator's core network by using the highest priority wireless access network as indicated by the policy, whenever this policy is valid.

3GPP technical specification 24.312 describes an ANDSF Mobility Object (MO) which conforms to Open Mobile Alliance (OMA) Device Management (DM) protocol specifications. The MO provides relevant parameters for inter-system mobility policy, inter-system routing policy and access network discovery. The inter-system mobility policy information consists of a set of one or more inter-system mobility policies. At any point in time at most only one policy is applied in the wireless communication device, and referred to as the "active" policy. Each policy has a number of validity conditions, such as device location and time of day which determine whether the policy may be valid, and a number of results, such as which wireless access technologies or networks are restricted or preferred (in priority order), which are applied when the policy is active. Policies also have associated priorities, so as to determine which of several potentially valid policies has the highest priority and should be considered as active in preference to other potentially valid policies.

When one or more networks become congested in particular areas it would be desirable to change the ANDSF policies at wireless communication devices in those areas to alleviate the congestion and to take advantage of less congested access network resources. However, requiring the network to regularly "push" new policies to a large number of handsets to implement such a scheme is not practical.

It would be desirable to address problems of the related prior art, for example to provide improved selection by a wireless communication device from available wireless access networks.

BRIEF DESCRIPTION OF THE DRAWINGS

A wireless communication device, a wireless communication system comprising such a device, and a method of selecting an access network in such a wireless communication device or system, in accordance with the disclosure will now be described, by way of example only, with reference to the accompanying drawings in which.

DETAILED DESCRIPTION OF THE DRAWINGS

A wireless communication device for use with the wireless communication system in accordance with the disclosure may be a portable or handheld or mobile telephone, a Personal Digital Assistant (PDA), a portable computer, portable television and/or similar mobile device or other similar communication device. In the following description, the communication device will be referred to generally as a UE (user equipment) for illustrative purposes and it is not intended to limit the disclosure to any particular type of wireless communication device.

Figure 1:
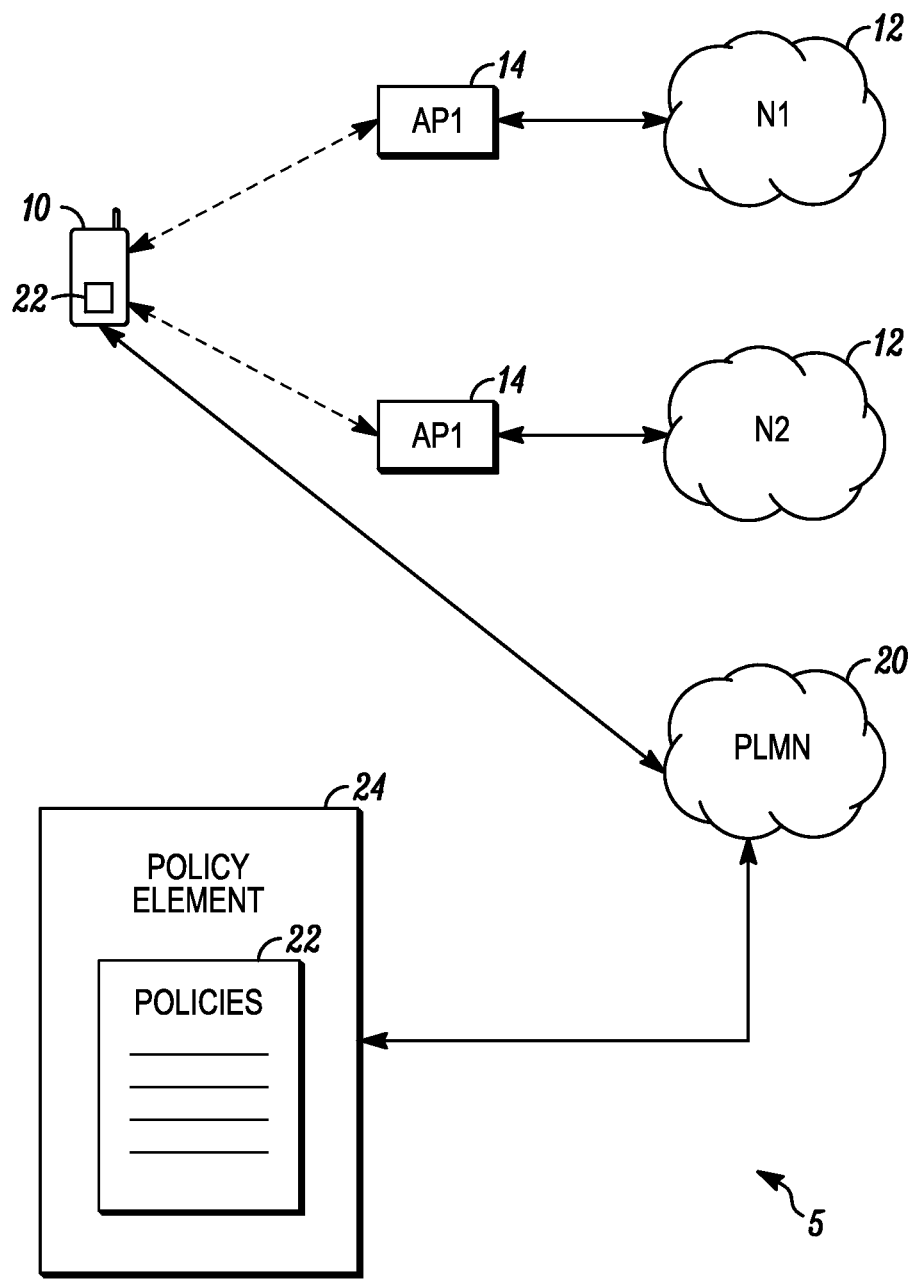
FIG. 1 illustrates a wireless communication system 5 in accordance with the invention, in which a policy element provides policy rules to a user equipment for use in selecting an available wireless access network.

A wireless communication system 5 in accordance with the disclosure is shown in FIG. 1. A user equipment 10 operates within a public land mobile network (PLMN) 20, such as a 3GPP or other mobile telephone network. The user equipment 10 is also arranged to detect one or more wireless access networks 12 such as access networks N1 and N2 through access points 14 such as access point AP1 and access point AP2. The wireless access networks 12 that the user equipment can detect may all be of the same technology type or of different technology types. Such technology types may include, for example, access networks conforming to one or more of the IEEE 802.11 and 3GPP/3GPP2 standards.

The user equipment 10 receives policies 22 from a policy element 24 which also forms part of the PLMN 20. These policies 22 enable the user equipment 10 to automatically select one of the available wireless access networks 12 for connection to provide data carrying services. In particular, the policies 22 specify one or more access capabilities required of an available wireless access network 12 for the wireless access network 12 to be selected for connection and use by the user equipment 10. The policies may be requested by the policy element 24 using a "pull" transaction, or may be sent by the policy element 24 to the user equipment 10 using a "push" transaction. In some circumstances the policies may be adapted or modified at the user equipment, for example by deleting or modifying policies that are not relevant to the user equipment or its location or other circumstances.

The policies 22 may be continuously or periodically used by the user equipment 10 to evaluate which of the available access points 14 and/or wireless access networks 12 best meets the policies, and to select and change to a new access point and/or wireless access network when the current connection does not meet with the policies, or a different access point meets with a policy of a higher priority than the currently connected access point.

An access capability in a policy may specify a minimum or a maximum, or some other constraint, threshold or measure based on a particular capability, information on which is advertised or otherwise available from an available access network, or may specify such a constraint, threshold or measure based on more than one pieces of available information. For example, a policy access capability may specify a lower threshold for an average or some other combination of uplink and downlink capacities. Where, herein, an access capability is said to comprise a particular measure such as WLAN air-interface or backhaul utilisation, this may mean that the access capability of a policy provides a constraint or similar based on this and optionally also on other measures, or may mean that such a measure alone or in combination with other measures is determined using information from or about a particular access network, as the context requires. Some policy access capabilities may be numeric, for example specifying a minimum available transmission rate, or may be logical or represent domains or sets, for example specifying interworking with particular network domains.

Access network capabilities may relate to a variety of aspects of network capability, such as available capacity for example in terms of uplink and downlink capacities, whether certain ports or IP protocols are allowed or blocked by the access network, and whether the access network is capable of interworking with one or more other domains or networks. These and other access capabilities will be discussed in more detail below.

Figure 2:
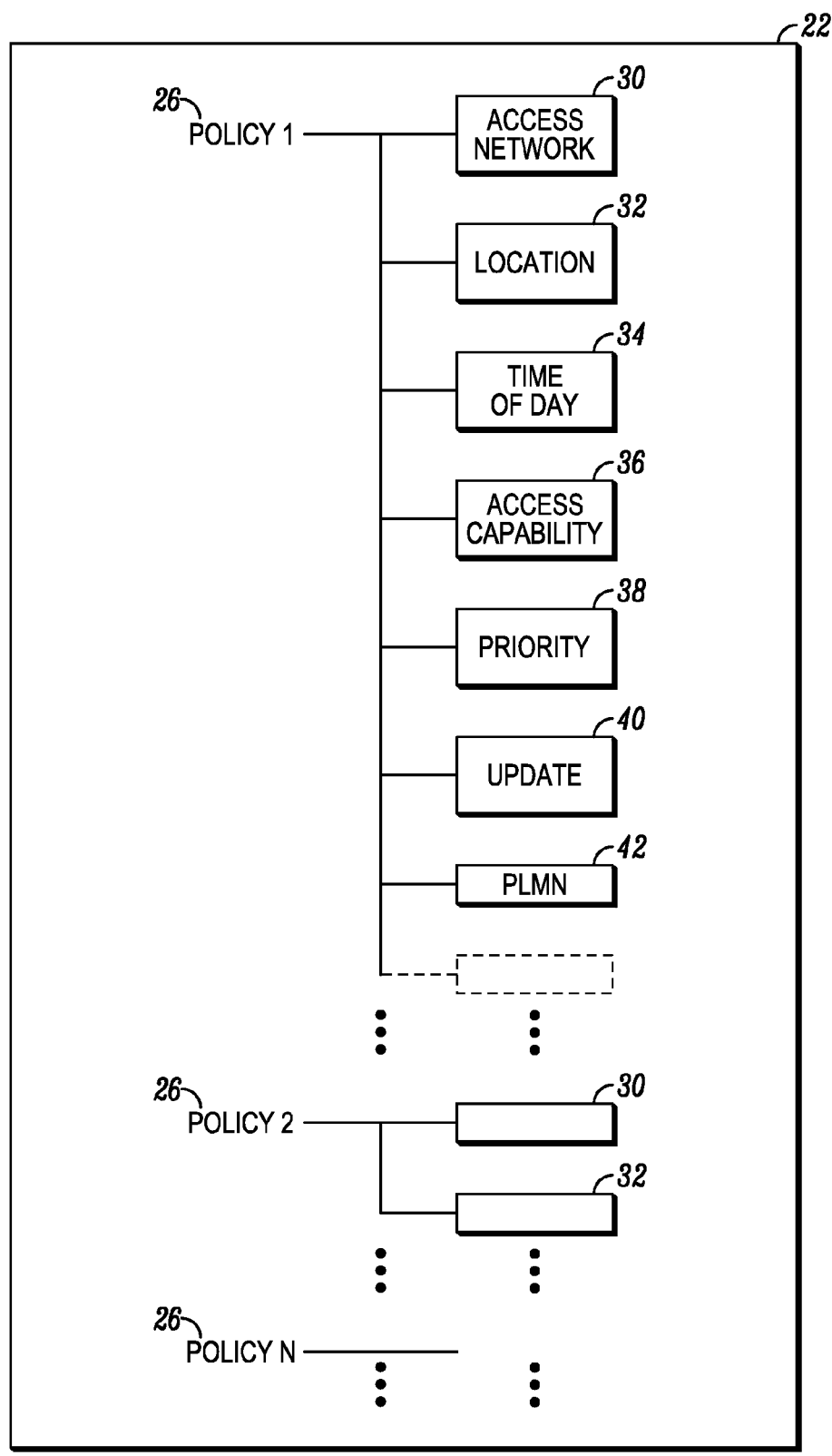
FIG. 2 shows in more detail example policies of FIG. 1.

FIG. 2 illustrates various possible aspects of the policies 22 which may be held or generated at the policy element 24 and/or stored and applied at the user equipment 10. Each of the one or more individual policies 26 contains a plurality of aspects relating to different circumstances to be met for the rule to be considered active and therefore applied in the user equipment to preferentially connect to an available wireless access network satisfying a policy 26. One such aspect illustrated in FIG. 2 is a prioritized access network specification 30 that defines a prioritized list of access networks or technology types (WiFi, WiMAX, 3GPP, etc.) which the user equipment should attempt to use in priority order for connecting to the operator's core network.

Another such aspect illustrated in FIG. 2 is a location specification 32, which defines the geographical location of the user equipment 10 in which the corresponding policy is valid. This geographical location may be defined in terms of longitude and latitude coordinates or in relation to a wireless network specific location, such as a 3GPP PLMN and location area code, or a WiFi SSID, etc. A further such aspect is a time of day specification 34 defining times of day, dates or other time window based information which must be met for the rule to be valid.

A further one of the aspects of a policy 26 illustrated in FIG. 2 is an access capability specification 36. This specification defines the capabilities an access network 12 must have (such as the available uplink and/or downlink speed) before this network can be selected for connection. If, for example, the prioritized access network specification includes two access networks, then when the user equipment attempts to select one of them for connection, it will first determine if the highest priority access network meets the capabilities defined in the access capability specification. If it does, this access network can be selected, otherwise the user equipment determines if the second highest priority network meets the capabilities defined in the access capability specification. If none meets this specification, then the corresponding policy is not used and the user equipment checks the next policy in priority order. Some circumstances which may be defined in the access capability specification may be:

a particular port or range of ports is allowed for use if the user equipment connects to the wireless access network;

a particular port or range of ports is blocked or not allowed for use if the user equipment connects to the wireless access network;

a particular IP protocol or set of protocols is allowed for use if the user equipment connects to the wireless access network;

a particular IP protocol or set of protocols is blocked or not allowed for use if the user equipment connects to the wireless access network;

one or more constraints on the number of clients currently associated with the access point to be connected to, such as a maximum number of clients;

one or more constraints on air interface or backhaul utilization for an access point, for example a limit on the percentage of time the medium is busy for a particular access point;

available transmission rate in the uplink and/or downlink direction specifying how fast the user equipment is expected to transmit in the uplink direction or how fast it is expected to receive in the downlink direction;

constraints on interworking capability, for example defining one or more particular network realms (also called domains) or organization identifiers (OIs) which the access network can interwork with. Such interworking capabilities are defined in the IEEE 802.11u specification.

A policy 26 may contain various other aspects, such as a policy priority specification 38 which can be used to prioritize among many rules. When the user equipment 10 is provisioned with a plurality of policies, it first considers the policy with the highest priority. If this policy cannot be activated (for example because the policy is not valid or no available access network meets the access capability specification) then the user equipment proceeds to considering the second highest priority rule, and so on. An update specification 40 may also be included in the rule specifying for example how and when the policy rule may be updated. A PLMN specification 42 may also be included specifying which specific PLMN provided the corresponding policy. Note that in a roaming situation, the user equipment can receive policies from the visited PLMN and from its home PLMN. Other policy aspects may also be provided.

Figure 3:
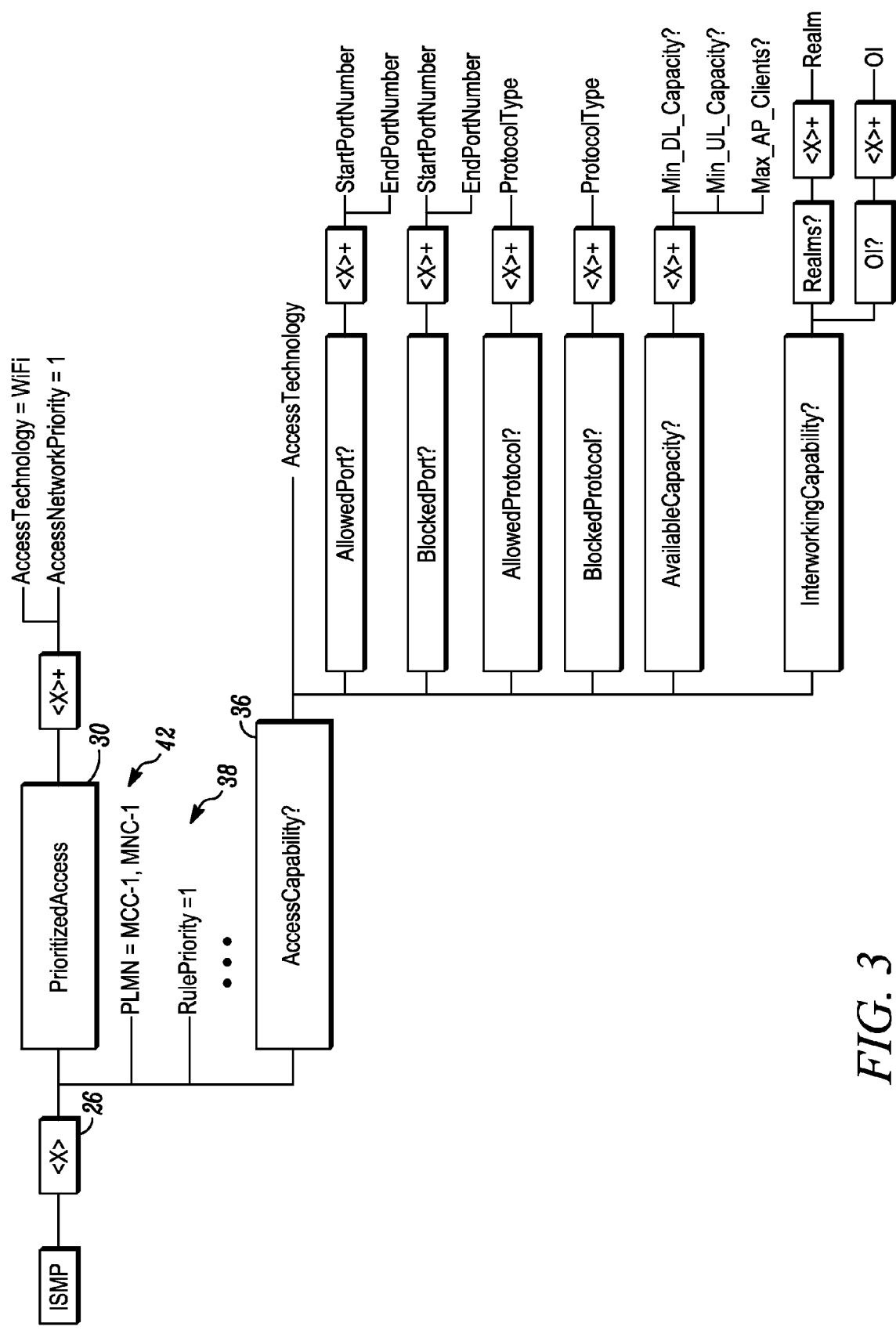
FIG. 3 shows example policies of FIG. 1 or 2 in an OMA DM format.

FIG. 3 illustrates a policy 26 such as that of FIG. 2 set out as an ANDSF MO in an OMA DM format. The reference numerals of FIG. 2 have been used where appropriate to denote some of the corresponding aspects between the figures. The prioritized access network specification 30 is provided by a "PrioritizedAccess" policy node that defines which access networks, in priority order, the user equipment should attempt to access when the policy becomes active. The access capability specification 36 is provided by an "AccessCapability" policy node which provides policy information as already discussed above in the form of various optional child nodes. In FIG. 3 these child nodes include "AllowedPort?" and "BlockPort?" nodes specifying corresponding port ranges, "AllowedProtocol?" and "Blockedprotocol?" nodes, an "AvailableCapacity?" node under which minimum downlink and minimum uplink transmission capacities are defined, and maximum current clients of an access point are specified. Finally, an "Interworking-Capability?" node is also provided which defines the domains (i.e. the external networks) an access network must support before being selected for communication.

Although FIG. 3 shows an access capability node added to an ANDSF ISMP policy, a similar access capability node can be added to an ANSDF ISRP policy for use by a user equipment, to constrain or indicate preferences for how IP flows should be routed through available wireless access networks. For example, an ISRP access capability node could indicate preference for routing a video streaming flow through a WiFi access network only if the WiFi access can support at least 700 Kbps minimum downlink capacity. In contrast to ISMP policy, the ISRP policy is used when the user equipment operates multiple radio interfaces simultaneously (for example WiFi and 3G) and specifies preferences with respect to how traffic should be routed across the multiple radio access interfaces. For example, the ISRP policy could indicate that traffic to a particular destination IP address should preferably be routed through a WiFi access network or through a WiFi access network with a particular SSID. Similarly, the ISRP policy could indicate that traffic to a particular UDP port should preferably be routed through a 3G access network.

Adding to ISRP policy the access capability specification already discussed above makes it feasible to define routing policies that take into account the real-time capabilities of the access networks. For example, it becomes feasible to indicate to a user equipment that IP traffic to a particular TCP port shall preferably be routed through a WiFi access network only if the WiFi access network does not block traffic to the particular TCP port. Similarly, it makes it feasible to indicate to a user equipment that IP traffic to a particular IP address range shall preferably be routed through a WiFi access network only if the WiFi access network can support a particular downlink capacity, for example 1 Mbps. In order for a user equipment to measure an access point or wireless access network 12 against an access capability specification of a policy 26, the user equipment needs to learn of the access capabilities of an access point 14 and/or wireless access network 12. This can be done in a variety of ways including by using information broadcast by an access point 14 and by sending queries to an access point or network and receiving in response information containing access capabilities. Suitable ways for a user equipment to learn such access capabilities are provided, for example, in the IEEE 802.11u and IEEE 802.11e standards.

Figure 4:
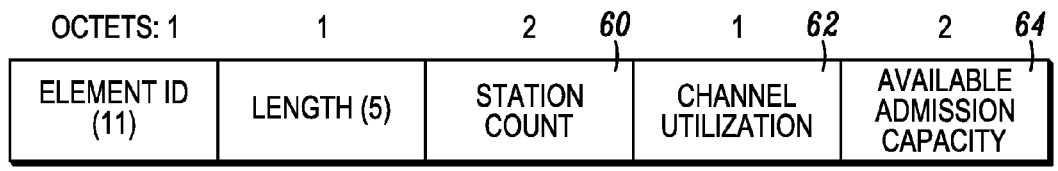
FIG. 4 illustrates a QBSS load element which may be broadcast by access points operating under the IEEE 802.11e standard.

FIG. 4 illustrates a QBSS (quality of service enhanced basic service set) load element (LE) which may be broadcast by access points operating under the IEEE 802.11e standard. The load element includes a station count field 60 which advertises the total number of clients currently associated with the access point, an air-interface channel utilization field 62, which advertises the percentage of time, normalised to 255, over which the access point air medium was busy, and an available admission capacity field 64, which specifies the remaining amount of medium time available via explicit admission control, in units of 32 microseconds. Access points operating under IEEE 802.11 standards may also broadcast Support Rates or Extended Supported Rates (SR, ESR) load elements advertising data rates which the access point supports. A policy r26 used by a user equipment may be provided with one or more policy specifications making use of such broadcast data, or information derived from such data, in order to assess the access capabilities of an access point and/or wireless access network as discussed above.

A user equipment 10 may use data such as that broadcast in a QBSS, SR or ESR load element, or other similar access capability data broadcast by an access point 14 and/or wireless access network 12, to estimate in real time the load conditions on the relevant air interface and therefore to determine how much bandwidth is available for communication.

Although data broadcast by an access point 14 under IEEE 802.11 standards may be used, access capabilities can also or instead be assessed by a user equipment 10 sending one or more queries to an access point 14 or wireless access network 12. For example, the IEEE 802.11u standard in combination with the Hot Spot 2.0 standard (currently in preparation by the WiFi alliance) define an Access Network Query Protocol (ANQP) which operates over a Generic Advertisement Service (GAS). The user equipment 10 may use GAS/ANQP or another query service (such as the Mobile Information Service, MIS, defined in IEEE 802.21) to discover various access capabilities of an access point 14 or wireless access network 12. Under GAS/ANQP and/or the HotSpot 2.0 standard, the user equipment 10 may determine some or all of the following access capabilities:

WAN metrics such as WAN uplink/downlink availability and available speeds, which indicate the uplink/downlink speed of the WiFi backhaul link;

WAN utilisation indicating the percentage of WAN (backhaul) capacity that is currently utilized;

Connection capability, providing information on the connection status of the most commonly used communications protocols and ports (such as a firewall upstream to an access point 14 allowing communication on certain IP protocols and ports, while blocking communication on others); and Interworking capability, providing information about the domains (e.g. example.com) that are arranged for interworking with a specific WiFi network.

Figure 5:
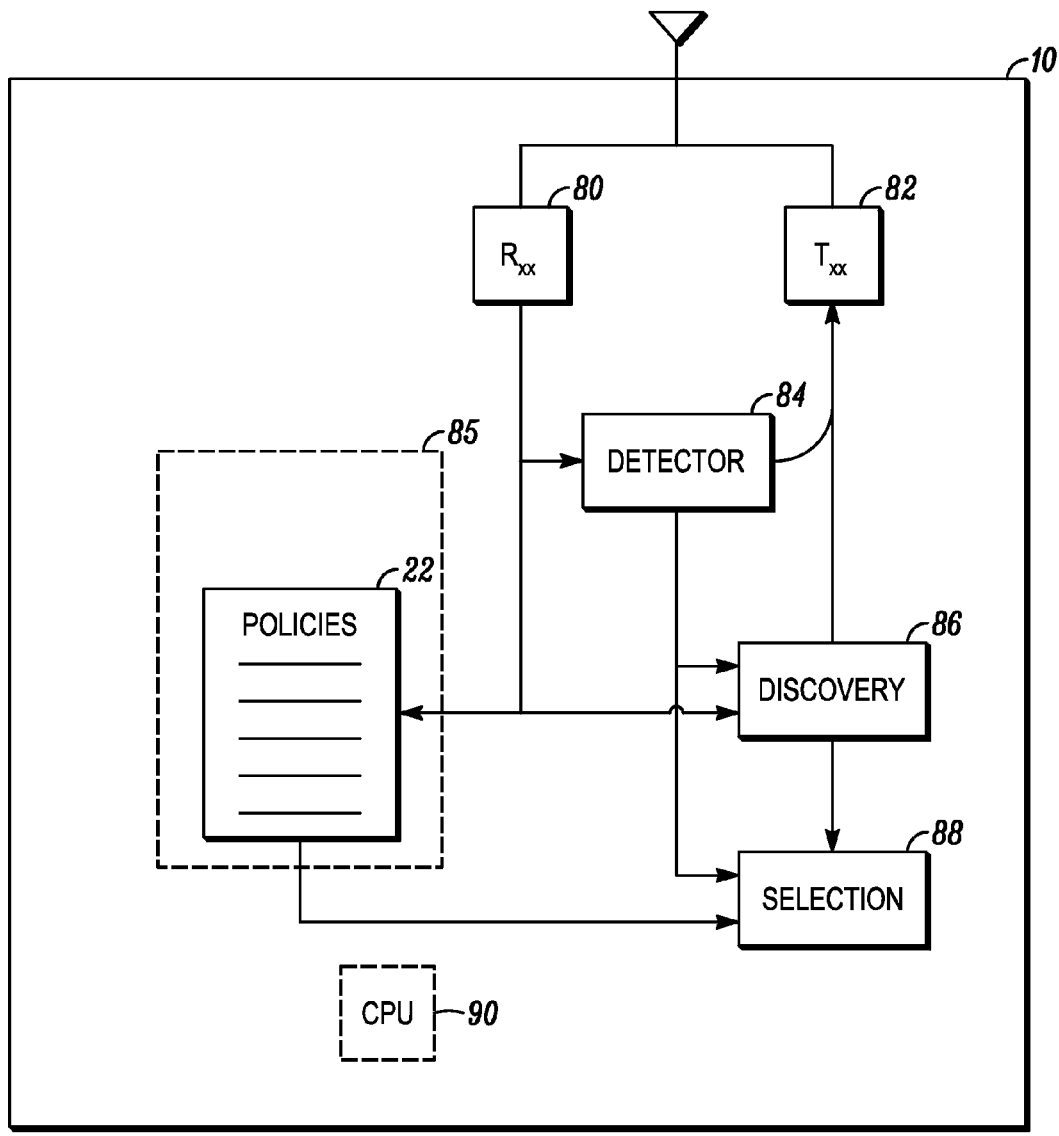
FIG. 5 illustrates aspects of a user equipment in accordance with the invention.

FIG. 5 illustrates schematically a user equipment 10 according to the present invention, and arranged for putting into effect the schemes discussed above. Only selected aspects of the user equipment relating to the invention are illustrated, but it will be understood that the user equipment is also provided with conventional parts necessary to implement the user equipment.

As shown in FIG. 5, the user equipment 10 is provided with policies 22 as variously described above, stored in a suitable memory 85. These policies may typically be received over a network from a remote policy element 24 as illustrated in and discussed above in respect of FIG. 1. To this end, the policies 22 shown in FIG. 5 are shown as being provided via a receiver 80 of the user equipment 10. A detector element 84 in communication with the receiver 80 and also with a transmitter 82 of the user equipment is arranged to detect multiple wireless access networks available for connection to the user equipment for providing data services. Based on information received from the detector element 84 identifying the available access networks, a discovery element 86 connected to the transmitter 82 and receiver 80 is arranged to discover one or more access capabilities of at least one of the detected wireless access networks, these access capabilities being, for example, as variously described above. A selection element 88 is also provided which, using information received from the detector element 84 identifying the available access networks and information received from the discovery element 86 providing access capabilities of at least one of the available access networks, implements the policies 22 to select an access network for connection and provision of data services to the user equipment 10.

The detector element 84, discovery element 86 and selection element 88 of user equipment 10 may typically be provided in software running on one or more microprocessors 90 of the user equipment, which is also provided with suitable memory, for example memory 85, in which such software and the policies 22 are stored.

In arrangements implemented using ANDSF policies according to current 3GPP implementations, policies can be made conditional upon a specific location and time of day, for example "WiFi access is restricted if the time is between 11 pm and 6 am". In contrast, and as set out above, the invention enables provision in user equipments 10 of access selection and routing policies that take into account access point and/or access network connectivity features or access capabilities. For example, the invention enables a network operator to implement policies such as the following:

preferred access network is WiFi, but only if it does not block traffic to a specified port;

preferred access network is WiFi, but only if it can interwork with a specified realm;

voice-over-IP traffic should be routed to a WiFi access network, but only if the WiFi uplink and downlink capacities are greater than 100 Kbps;

traffic for a particular application (e.g. YouTube) should be routed over a WiFi access network, but only if the WiFi downlink capacity is greater than 700 Kbps.

When one or more networks become congested in particular areas, user equipments 10 already provisioned with suitable policies according to the invention are able to automatically select and use particular access networks in a manner which helps alleviate the congestion and takes advantage of less congested access network resources, without requiring the network to actively "push" new policies to user equipments in dynamic response to the congestion.

In the foregoing specification, the invention has been described with reference to specific examples of embodiments of the invention. It will, however, be evident that various modifications and changes may be made therein without departing from the broader scope of the invention as set forth in the appended claims. For example, although the policies may be delivered to a user equipment over the network 20 from a remote policy element 24, they may also or instead be pre-configured in the user equipment, for example during manufacture or before delivery of the user equipment to a customer.

Some of the above embodiments, as applicable, may be implemented using a variety of different processing systems. For example, the Figures and the discussion thereof describe an exemplary architecture and method which is presented merely to provide a useful reference in discussing various aspects of the disclosure. Of course, the description of the architecture and method has been simplified for purposes of discussion, and it is just one of many different types of appropriate architectures and methods that may be used in accordance with the disclosure. Those skilled in the art will recognize that the boundaries between program elements are merely illustrative and that alternative embodiments may merge elements or impose an alternate decomposition of functionality upon various elements.

The invention claimed is:

1. A wireless communication device comprising:
    a detector element arranged to detect multiple wireless access networks available for connection to the wireless communication device for providing data services;
    a transmitter;
    a receiver;
    a discovery element arranged for
        sending, using the transmitter, a query to one or more of the multiple wireless networks, wherein the query relates to access capabilities of the one or more wireless networks;
        receiving, using the receiver, a response to the query, wherein the response includes information regarding the access capabilities of the one or more wireless networks;
    a memory storing one or more policies, each of the one or more policies specifying one or more access capabilities required of an available wireless access network for the wireless access network to be selected for connection, the one or more access capabilities required of the available wireless access network for the wireless access network to be selected for connection being received via the receiver, and the one or more access capabilities required of the available wireless access network for the wireless access network to be selected for connection specifying one or more requirements that the available wireless access network must meet in order for the available wireless access network to be selected for connection; and
    a selection element arranged for selecting an access network based on a policy of the one or more policies, said policy having been determined valid according to one or more validity conditions.

2. A method of operating a wireless communication device for selection of an available wireless access network comprising:
    storing one or more policies, each policy specifying one or more access capabilities required of an available wireless access network for the wireless access network to be selected for connection, the one or more access capabilities required of the available wireless access network for the wireless access network to be selected for connection being received via a receiver of the wireless communication device, and the one or more access capabilities required of the available wireless access network for the wireless access network to be selected for connection specifying one or more requirements that the available wireless access network must meet in order for the available wireless access network to be selected for connection;
    detecting multiple wireless access networks available for connection to the wireless communication device;
    sending a query to a wireless network of the multiple available wireless networks regarding its access capabilities;
    receiving, in response to the query, information regarding the wireless access capabilities of the queried network;
    determining whether a policy of the one or more policies is valid;
    determining whether the wireless network complies with the policy; and selecting or not selecting the wireless network based on the determination of whether the policy is valid and on the determination of whether the wireless network complies with the policy.

3. The method of claim 2,
wherein the one or more policies comprises a plurality of policies,
the method further comprising: if the policy is determined not to be valid or the network is determined not to comply with the policy, repeating the determining steps using another of the plurality of policies.

4. The method of claim 2,
wherein the one or more policies comprises a plurality of policies, the plurality of policies having a rank order, each of the policies of the plurality being ranked within the order,
method further comprising: if the policy is determined not to be valid or the network is determined not to comply with the policy, repeating the determining steps using the next ranked policy of the rank ordered policies.

5. The method of claim 2,
wherein the queried wireless network is a first wireless network,
the method further comprising:
    sending a query to a second wireless network of the available wireless networks regarding the second wireless network's access capabilities;
    receiving, in response to the query, information regarding the second wireless network's access capabilities;
    determining whether the second wireless network complies with the policy; and
    selecting or not selecting the second wireless network based on the determination of whether the policy is valid and on the determination of whether the second wireless network complies with the policy.

6. The method of claim 2,
wherein determining whether a policy of the one or more policies is valid comprises determining whether the time of day and the geographic location of the wireless communication device meets validity conditions for the policy, and
wherein determining whether the available wireless network complies with the policy comprises determining whether the wireless network permits access to one or more particular ports.

7. The method of claim 2,
wherein determining whether a policy of the one or more policies is valid comprises determining whether the time of day and the geographic location of the wireless communication device meets validity conditions for the policy, and
wherein determining whether the wireless network complies with the policy comprises determining whether the constraints on the number of clients permitted to use an access point of the wireless network, limits on the percentage of time that a particular medium is busy for the access point, uplink or downlink transmission rates, and internetworking capability comply with the policy.

8. The method of claim 2, further comprising:
receiving the one or more policies from a public land mobile network; and
deleting or modifying a policy of the one or more policies if the policy is not relevant to the wireless communication device.

9. The method of claim 2,
wherein determining whether the wireless network complies with the policy comprises determining whether the destination of data to be transmitted by the wireless communication device is a particular IP address, and
routing the data to the wireless network based on the determining step.

10. The method of claim 2,
wherein determining whether the available wireless network complies with the policy comprises
    determining that the wireless communication device is to download video data;
    determining whether the available wireless network has a downlink capacity above a predetermined amount, and
    selecting the available wireless network based on the video data and downlink capacity determinations.

11. The method of claim 2, further comprising:
receiving the one or more policies from a public land mobile network;
wherein the detecting step comprises detecting a local area network access point of the wireless network;
wherein determining whether the wireless network complies with the policy comprises determining whether the local area network access point blocks traffic to a particular port, and
wherein the selecting step comprises selecting the wireless network only if the access point does not block traffic to a particular port.

* * * * *